(12) United States Patent  (10) Patent No.: US 7,693,876 B2
Hackworth et al.  (45) Date of Patent: Apr. 6, 2010

(54) MONITORING USAGE RATE PATTERNS IN STORAGE RESOURCES

(75) Inventors: Brian Hackworth, Sunnyvale, CA (US); Nagender Somavarapu, Bangalore (IN); Hemanth Pannem, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 149 days.

(21) Appl. No.: 11/626,450

(22) Filed: Jan. 24, 2007

(65) Prior Publication Data

US 2008/0174426 A1 Jul. 24, 2008

(51) Int. Cl.
G06F 12/00 (2006.01)
G06F 17/30 (2006.01)
G06F 15/173 (2006.01)

(52) U.S. Cl. ............................. 707/200; 707/1; 709/224
(58) Field of Classification Search .................... 705/28, 705/1, 16; 714/38, 124, 37; 709/223, 224; 702/122, 187
See application file for complete search history.

(56) References Cited

U.S. PATENT DOCUMENTS

| 5,049,873 | A | * | 9/1991 | Robins et al. | .......... | 340/825.01 |
| 6,836,800 | B1 | * | 12/2004 | Sweet et al. | ................ | 709/224 |
| 7,448,230 | B2 | * | 11/2008 | Esposito et al. | ............... | 62/656 |
| 2007/0294206 | A1 | * | 12/2007 | Korman et al. | ................. | 707/1 |

* cited by examiner

*Primary Examiner*—F. Zeender
*Assistant Examiner*—Hajime Rojas
(74) *Attorney, Agent, or Firm*—Perkins Coie, LLP

(57) ABSTRACT

In a method and system for monitoring storage resources, storage containers are monitored to identify their individual normal usage patterns over time. Based on a storage container's normal usage pattern, limits may be established for determining whether its rate of change over a predetermined amount of time (i.e., usage change rate) is normal or abnormal based on a mean and a standard deviation of historical usage rate values. The limits are periodically updated to ensure that the limits remain indicative of the storage container's current usage pattern, as usage patterns may vary over the life of a storage container.

18 Claims, 5 Drawing Sheets

MONITORING USAGE RATE PATTERNS IN STORAGE RESOURCES

FIELD OF INVENTION

The present invention generally relates to computer storage systems, and more particularly, to a method and system for monitoring usage rate patterns in storage resources.

BACKGROUND

Existing approaches for monitoring storage resources are limited to providing alerts based on raw space and to alerts based on percentages of space used. Alerts based on raw space require an operator to manually tune each storage container's thresholds based on its intended use and size. Alerts based on percentages of space used are better than alerts based on raw space in that they do not require manual tuning based on size, but still require manual tuning based on the intended use of the volume.

Storage resources (e.g., storage servers) typically include a plurality of storage containers (e.g. physical and/or logical volumes), which in turn may be providing storage for different types of file systems. Different types of file systems often involve different rates of change within their respective storage containers. For modern large enterprises with thousands of storage containers, manual tuning is impractical.

By way of example, storage containers holding shared program files change rarely, and can typically stand to be relatively full, whereas volumes holding log files may grow and shrink drastically over their normal life. A single percentage threshold setting does not work across all storage containers, thereby requiring manual tuning by an operator.

Accordingly, there is a need for monitoring storage resources without the limitations of the prior art.

SUMMARY

The present invention is a method and system for monitoring storage resources. Storage containers are monitored to identify their individual normal usage patterns. Based on a storage container's normal usage pattern, limits may be established for determining whether its rate of change over a predetermined amount of time (i.e., usage change rate) is normal or abnormal. The limits are periodically updated to ensure that the limits remain indicative of the storage container's normal usage pattern, as usage patterns may vary over the life of a storage container. The storage containers are also monitored to determine whether or not the usage change rate in each storage container is within its respective limits.

BRIEF DESCRIPTION OF THE DRAWINGS

A more detailed understanding of the invention may be had from the following description of preferred embodiments, given by way of example, and to be understood in conjunction with the accompanying drawings, wherein.

DETAILED DESCRIPTION OF THE PREFERRED EMBODIMENTS

It is noted that the term "storage container" is used simply for convenience in describing the present invention and, as used herein, may include physical volumes, logical volumes, file systems, or any type of data repository as well as any number thereof. In an exemplary embodiment, the present invention is implemented as an application executing on a computer operating system. For example, the storage containers are served by storage systems running the NetApp® Data ONTAP® operating system available from Network Appliance, Inc., Sunnyvale, Calif., and the application runs on a separate management station using the Linux®, Solaris®, or Windows® operating systems. In another embodiment, the application can run on a storage server.

Figure 1:
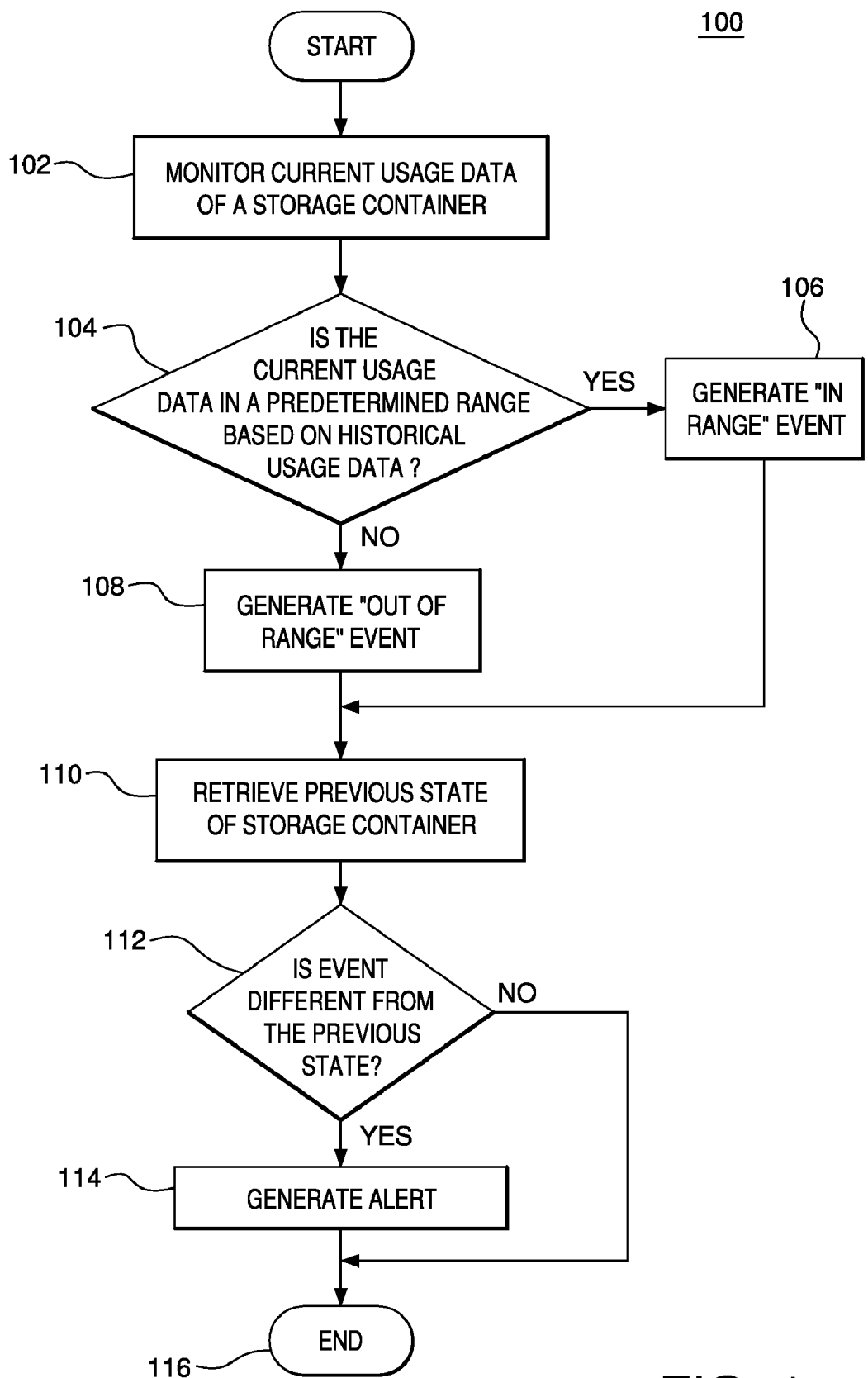
FIG. 1 is a flowchart of a method for monitoring the usage change rate of a storage resource and generating alerts based on the change rate.

FIG. 1 is a flowchart of a method 100 for monitoring the usage change rate of a storage container and generating alerts based on its change rate. The current usage data of a storage container is monitored (step 102). A determination is made whether the current usage data for the storage container is within a predetermined range based on historical usage data for the storage container (step 104). If the current usage data is within the predetermined range, then an "in range" event is generated (step 106). If the current usage data is outside of the predetermined range, then an "out of range" event is generated (step 108). It is noted that additional detail regarding steps 102-108 is provided in conjunction with FIG. 2.

After an event is generated either at step 106 or step 108, the previous state of the storage container is retrieved (step 110). The event is compared with the previous state to determine whether the state of the storage container has changed (step 112). If the state of the storage container has changed (either from "in range" to "out of range" or vice versa), an alert is generated (step 114) and the method terminates (step 116). If the state of the storage container has not changed, then the method terminates (step 116) without generating an alert.

Figure 2:
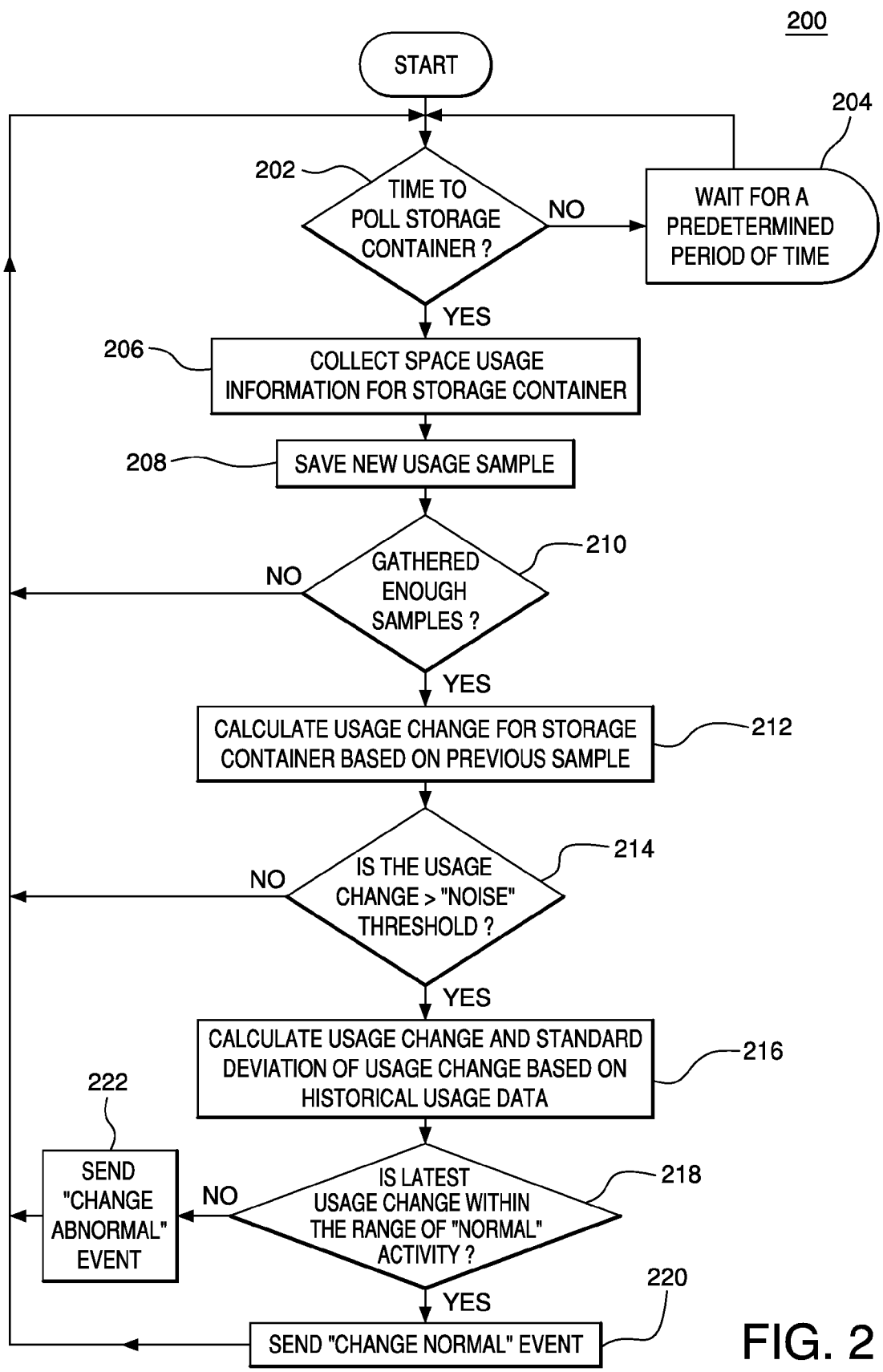
FIG. 2 is a flowchart of a method for monitoring the usage change rate of a storage resource.

FIG. 2 is a flowchart of a method 200 for monitoring the usage change rate of a storage resource. The method 200 provides details of steps 102-108 of the method 100. The usage change rate can be either a growth rate of the storage resource or a decrease rate of the storage resource. The method 200 begins by making a determination whether it is time to poll the storage containers (step 202). The polling is performed on a periodic basis to continuously monitor the storage containers; in an exemplary embodiment, the polling is performed every 30 minutes, but may be performed at any interval as desired. For example, the polling interval can be adjusted to permit faster notification of abnormal storage system behavior. However, there is a trade-off between early notification of problems and the computational overhead to poll the storage containers more frequently. If it is not time to poll the storage containers, the method 200 waits for a predetermined period of time (step 204) before checking the time again (step 202).

If it is time to poll the storage containers (step 202), space usage information (also referred to as a "sample") is collected for the storage container (step 206). The new sample for the storage container is saved to a history table (step 208). In an exemplary embodiment, the history table is implemented by a relational database, although any type of database or data structure can be used. It is noted that all samples are added to the history table, including a sample that causes an abnormal event (discussed below), as this helps in calculating the correct normal behavior of the storage container over time.

A determination is made whether enough samples have been gathered (step 210). In an exemplary embodiment, 25 samples can be gathered for a storage container to determine meaningful results for normal behavior. The number of samples to be gathered can be set by a user of the storage management system and can be based on a variety of factors including, but not limited to, type of storage system, field of use of the storage system, time of day (i.e., workload) requirements, user preference, etc. Although different numbers of samples can be used, using a low number of samples may not provide enough context to be able to determine what is normal behavior for a storage container. By using a larger number of samples (e.g., 25), temporary changes in behavior or unique events can be averaged out, and a more stable definition of normal storage container behavior can be made. In an exemplary embodiment, normal usage behavior is calculated using a sliding window of the last 30 days of samples. This window can be extended to consider longer time spans (e.g., quarterly or yearly). As with the number of samples collected, the time window needs to be large enough to provide context for the determination of normal behavior. It is possible for a user of the storage system to reset the sample history and restart collecting samples. If enough samples have not been gathered, then the method checks if it is time to poll the storage container (step 202) and the method continues as described above.

If enough samples have been gathered (step 210), the usage change rate for the storage container is calculated based on the difference from the previously collected sample (step 212). The following quantity is sampled each time the storage containers are polled. Suppose that d1 is the used space of the storage container at the previous monitoring interval, t1 is the timestamp at which d1 is collected, d2 is the used space of the storage container at the current monitoring interval, and t2 is the current timestamp. The change rate is calculated according to Equation 1, and indicates the change rate between the last monitoring interval and the current monitoring interval.

$$\text{change rate} = \text{abs}(d2-d1)/[t2-t1] \qquad \text{Equation (1)}$$

In an exemplary embodiment, an initial determination is made whether the calculated usage change rate exceeds a noise threshold (step 214). The noise threshold is a percentage value of the storage container's size that is configurable for each storage container. In an exemplary embodiment, the noise threshold is 1%, which means that changes of less than 1% of the storage container's size are considered to be normal changes. The noise threshold is a predetermined value used to determine whether a minimum amount of change has occurred in the storage container. It is noted that implementing a noise threshold is optional, but permits very small variations to be dropped without affecting the definition of normal behavior for the storage container. If the usage change rate does not exceed the noise threshold, then the method checks if it is time to poll the storage container (step 202) and the method continues as described above.

If the usage change rate exceeds the noise threshold (step 214), the average usage change rate and the standard deviation of the usage change rate are calculated based on historical usage data (step 216). The current usage change rate is compared against the mean and standard deviation to determine whether the current usage change rate is within the range of normal activity for the storage container (step 218). To determine whether the new sample is within the normal range, the following calculation is used. Suppose that M is the mean of all the samples, SD is the standard deviation of all the samples, and x is the usage change rate sensitivity of the storage container. If the usage change rate is within the range $$[M-(x*SD)] \text{ to } [M+(x*SD)] \qquad \text{Equation (2)}$$

this is considered to be normal activity for the storage container. If the new usage change rate is outside of this range, it is considered abnormal. In an alternate embodiment, the mean and standard deviation can be calculated by excluding the current sample. In an alternate embodiment, a representative sample of prior space usage values can be used instead of the mean, and a difference from the representative value can be used instead of the standard deviation.

Purely by way of example, the variable x can be in the range of (0-5]. In other words, the variable x can be any value that is greater than zero and less than or equal to five. In such an example, a value of x=5 indicates that the storage container is not sensitive to small changes in growth rates and only very high usage change rates should be reported. Low sensitivity values (e.g., x=0.1) indicate that the storage container is very sensitive to usage change rate changes, and that minor changes in the usage change rate can generate an abnormal event. In an exemplary embodiment, again simply for purposes of providing an example, the default value is x=2.

If the current usage change rate is within the normal range, then a "change normal" event is generated (step 220) and the method checks if it is time to poll the storage container (step 202) and the method continues as described above. If the current usage change rate is not within the normal range, then a "change abnormal" event is generated (step 222) and the method checks if it is time to poll the storage container (step 202) and the method continues as described above.

An example of a determination of normal storage container behavior (using a volume) is shown in Table 1 (in the Appendix). It is noted that while the example uses KB values for volume size measurements and calculations, any other magnitude of storage size is applicable. As shown in the example, the time is the time at which the sample is taken (in Table 1, the samples are numbered from 1-31, but it is noted that the samples can be marked with a time and date stamp). The volume size is the current used size of the volume. The change value is the amount of change from the previous sample. The rate of change per day is calculated according to Equation 1, as shown above. The change percentage is the rate of change per day divided by the volume size of the sample taken at the immediately preceding time (e.g., the change percentage at time 2 is the rate of change per day at time 2 divided by the volume size at time 1). The mean change and the standard deviation of change are calculated once a minimum number samples have been obtained (in the example, 25 samples). The range of normal change values (low and high) are calculated according to Equation 2 once a minimum number of samples have been obtained (in the example, 25 samples). In this example, it is assumed that the sensitivity value (the variable x in Equation 2) is 2.

The action column indicates whether the current sample, as expressed by the rate of change per day, is within the range of normal change for the volume. "Not enough samples" indicates that fewer than the minimum number of samples have been obtained. "Normal" indicates that the rate of change per day is within the range of normal change. In terms of storage system performance, a "normal" result indicates that the storage system is growing or shrinking in an amount that is consistent with past performance of the storage system, as indicated by the previous samples in the history table. "Less than 1%: OK" indicates that the change percentage is below 1%, which in the example is the noise threshold. "Not normal" indicates that the rate of change per day is outside of the range of normal change. In terms of storage system performance, a "not normal" result indicates that the storage system is growing or shrinking in an amount that is not consistent with past performance of the storage system, as indicated by the previous samples in the history table. The distinction between "normal" and "not normal" is important, as it is a way of indicating whether there is a potential problem with the storage system. For example, several "not normal" actions in a row may be an indication that the storage system is experiencing unexpected activity, is infected with a virus, or is otherwise close to failing. As such, a user of the storage system should investigate "not normal" actions to determine whether the storage system is operating properly. It is noted that these actions are exemplary and can change depending on the implementation.

Referring now to specific example provided in Table 1, a minimum of 25 samples are obtained to make a determination of normal storage container behavior. Therefore, in Table 1, for the first 24 samples taken, the result indicated in the action column is "not enough samples." At time 25, a mean change value, a standard deviation value, and low/high range of normal change values are generated. At time 25, the rate of change is normal.

As described above, a noise threshold is preferably set at 1% and where the change percentage (of the rate of change per day) of a volume results in a percentage change of less than 1%, it is not necessary to determine whether the rate of change per day is within the low/high range of normal change. At time 26, since the change percentage (−0.5%) is less than the 1% noise threshold, there is no need to compare the rate of change per day versus the low/high range of normal change and the action result contains an indication of "Less than 1%; OK."

At times 27 to 29, the change percentages are all greater than the 1% noise threshold and the rate of change per day is within the low/high range of normal change values. At time 30, the percentage change is above the 1% noise threshold, but the rate of change per day value (1140 KB) is above the high end of the range of normal change value (557.5). Therefore, the action indicates a "not normal" condition. At time 31, the rate of change per day is within the low/high range of normal change and the action indicates normal value behavior.

As can be seen from this example, the definition of normal behavior for the volume changes over time, as indicated by the low/high range of normal change values.

The total size of the storage container does not affect these calculations. For example, suppose there are two storage containers of size 100 GB and 1 TB and that both containers are rarely changing. For example, a sudden 20 GB change in either of these storage containers is considered abnormal irrespective of the total container size, even though in the latter container a 20 GB change is a smaller percentage of the total size.

In a particular example wherein the storage container is a volume, hole-reserve and overwrite-reserve values are deleted from the used space value before calculating the sample value. The hole-reserve and overwrite-reserve values are used space values that are set aside for use by the system, and deleting them from the used space value addresses the cases where a large LUN or space-reserved file is created in the volume. Hence the volume usage change caused by LUN creation is not considered to be abnormal, since it is not filled space in the storage container, but rather reserved space.

Figure 3A:
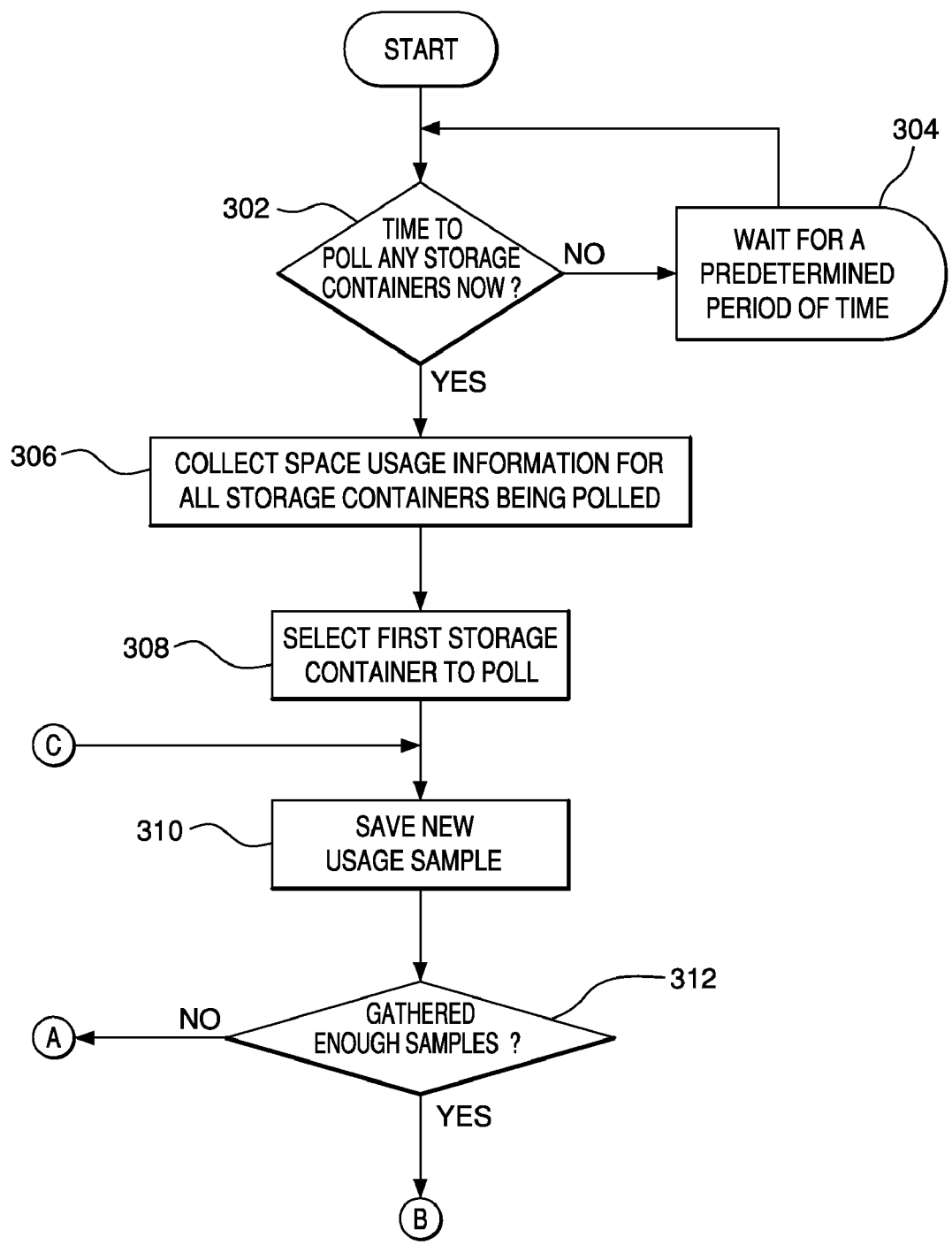
FIGS. 3A and 3B are a flowchart showing an exemplary implementation of the method shown in FIG. 2, for monitoring the growth rate of a storage resource.
Figure 3B:
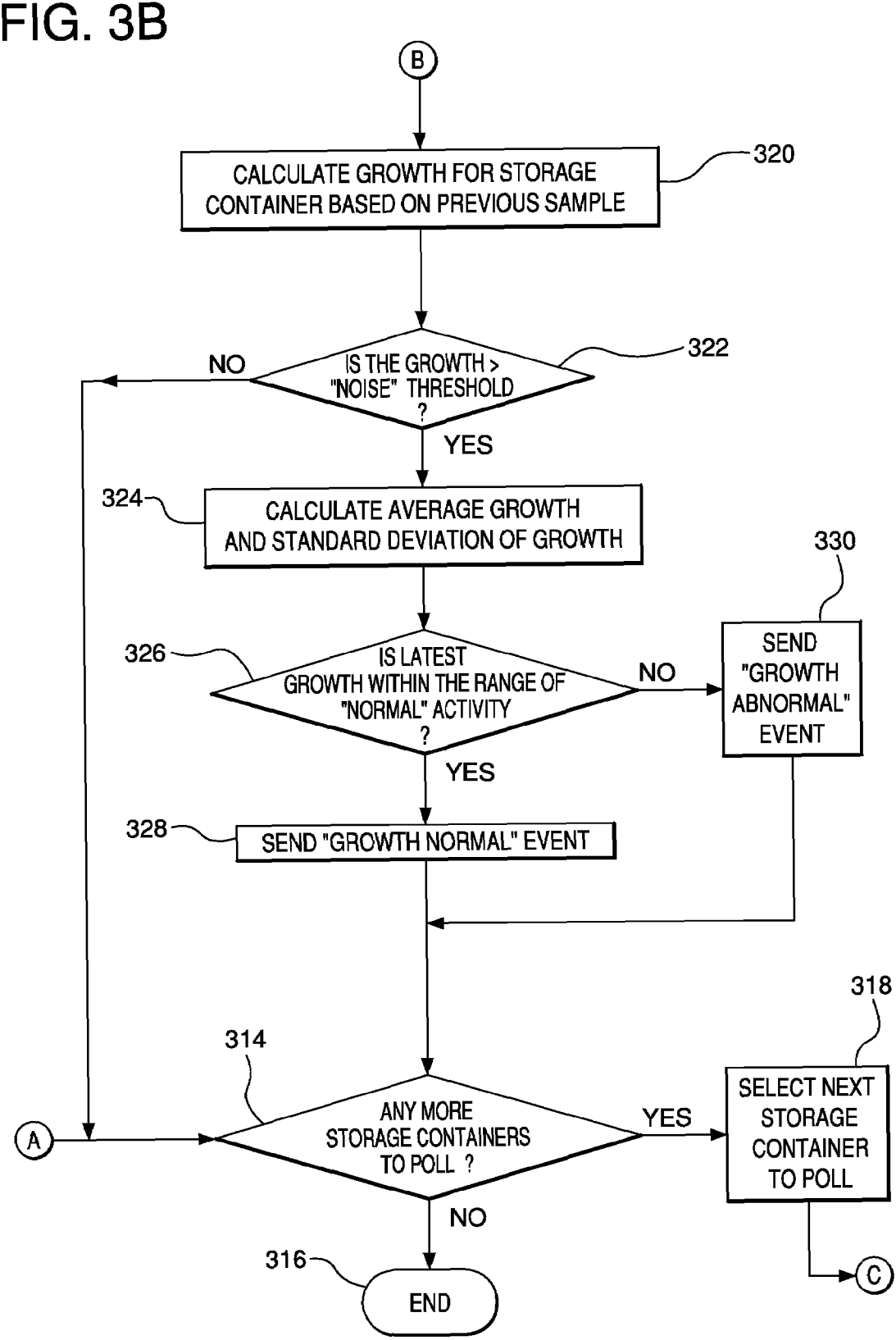

FIGS. 3A and 3B are a flowchart of a method 300 for monitoring the growth rate of a storage resource; the method 300 is an exemplary implementation of the method 200. The method 300 begins by making a determination whether it is time to poll any storage containers (step 302). It is noted that not all storage containers are polled at the same time. For practical implementation considerations, the polling may be staggered, but more than one storage container can be polled at a time. If it is not time to poll any storage containers, the method 300 waits for a predetermined period of time (step 304) before checking the time again (step 302). If it is time to poll at least one storage container (step 302), space usage information is collected for all storage containers being polled (step 306). The first storage container to be polled is selected (step 308). The new sample for the selected storage container is saved to a history table (step 310).

A determination is made whether enough samples have been gathered to determine meaningful results for normal behavior (step 312). If enough samples have not been gathered, then a determination is made whether there are any more storage containers to poll (step 314). If there are no more storage containers to poll, then the method terminates (step 316). If there are more storage containers to poll (step 314), then the next storage container to be polled is selected (step 318) and the method 300 continues from step 310 as described above. If enough samples have been gathered for the selected storage container (step 312), then the growth rate for the storage container is calculated based on the difference from the previously collected sample, per Equation 1 (step 320).

In the method 300, data growth in the volume is considered for event generation. For example, if a large logical unit number (LUN) is created in the volume, an event will not be generated because a LUN is reserved space in a volume, not filled space. But if the whole LUN is filled in a short time span, an event will be generated.

A determination is made whether the calculated growth rate exceeds a noise threshold (step 322). If the growth rate does not exceed the noise threshold, then a determination is made whether there are any more storage containers to poll (step 314). If there are no more storage containers to poll, then the method terminates (step 316). If there are more storage containers to poll (step 314), then the next storage container is selected (step 318) and the method 300 continues from step 310 as described above. If the growth rate exceeds the noise threshold (step 322), then the average growth rate and the standard deviation of the growth rate are calculated (step 324). The current growth rate is compared against the mean and standard deviation to determine whether the current growth rate is within the range of normal activity for the storage container, per Equation 2 (step 326).

If the current growth rate is within the normal range, then a "growth normal" event is generated (step 328) and a determination is made whether there are any more storage containers to poll (step 314). If there are no more storage containers to poll, then the method terminates (step 316). If there are more storage containers to poll (step 314), then the next storage container is selected (step 318) and the method 300 continues from step 310 as described above. If the current growth rate is not within the normal range, then a "growth abnormal" event is generated (step 330) and a determination is made whether there are any more storage containers to poll (step 314). If there are no more storage containers to poll, then the method terminates (step 316). If there are more storage containers to poll (step 314), then the next storage container is selected (step 318) and the method 300 continues from step 310 as described above.

Figure 4:
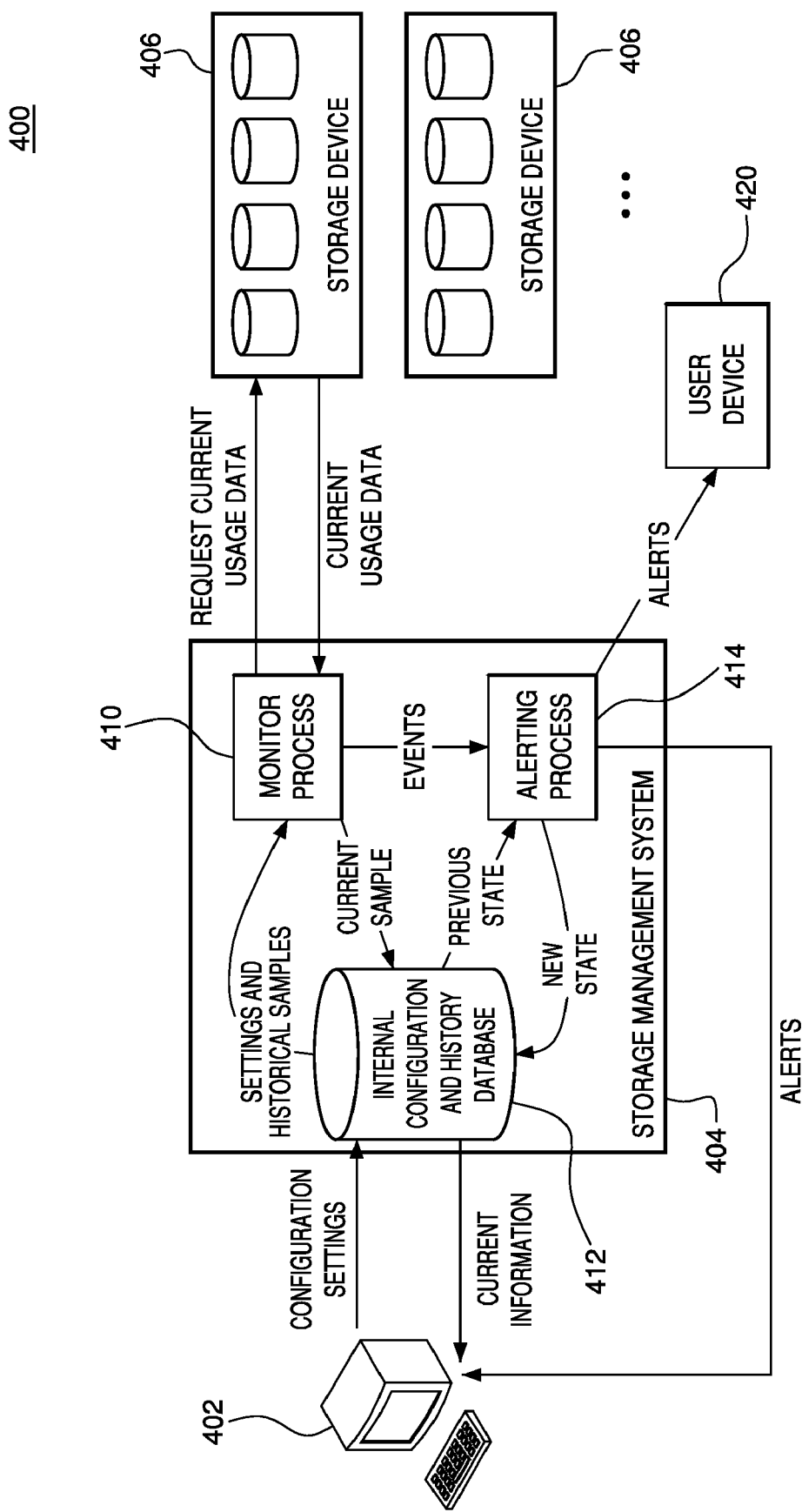
FIG. 4 is a diagram of a system configured to monitor the usage change rate of a storage resource.

FIG. 4 is a diagram of a system 400 configured to monitor the usage change rate of a storage resource. The system 400 includes a user terminal 402, a storage management system 404, and one or more storage devices 406, which collectively may generally be referred to as storage resources. The storage management system 404 includes a monitor process 410, an internal configuration and history database 412, and an alerting process 414. The monitor process 410 may be implemented by a monitoring device, the database 412 may be implemented by any kind of database (in an exemplary embodiment, a relational database is used), and the alerting process 414 may be implemented by an alerting device. In another embodiment, the monitor process 410 can run on a storage server.

Via the user terminal 402, a user of the storage management system 404 configures the monitor process 410. The configuration settings are stored in the database 412 and are used by the monitor process 410. The configuration settings include, but are not limited to, a polling interval of the storage containers, a time window to retain the usage data sample in the history tables, a minimum number of usage data samples required for determining normal volume behavior, and a usage change rate sensitivity setting, as described above. Of course, the configuration settings may vary and may include any type and/or number of particular configuration settings, as needed or desired.

In operation, the monitor process 410 obtains the configuration settings from the database 412. The monitor process 410 requests current usage data from each storage container in the storage device 406, and each storage container responds to the request with its current usage data. The monitor process 410 stores the current usage data sample in the database 412 and retrieves historical samples from the database 412 to perform usage change rate calculations and comparisons.

After the monitor process 410 has completed the growth rate comparison, an event is generated (either a "change normal" or "change abnormal" event) and is sent to the alerting process 414. The current state of the storage container is recorded in the database 412 and the alerting process 414 retrieves the previous state of the storage container from the database 412. The alerting process 414 compares the current state with the previous state to determine whether to send an alert. Generally, an alert is sent only if the current state of the storage container is different than the previous state (i.e., from "change normal" to "change abnormal" or vice versa).

If an alert is to be sent, the alerting process 414 provides an alert to the user terminal 402 and to a user device 420, such as a pager, cell phone, electronic mail account, or the like. The alerts can include, but are not limited to, an alarm, an electronic mail message, a pager notice, or a simple network management protocol (SNMP) trap.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

APPENDIX

TABLE 1

Example of determination of normal storage container behavior

| Time | Volume Size (KB) | Change (KB) | Rate of Change per Day (KB) | Change (%) | Mean Change (KB) | Std. Dev. (KB) | Range of Normal Change Low | High | Action |
|---|---|---|---|---|---|---|---|---|---|
| 1 | 1409 | | | | | | | | Not enough samples |
| 2 | 1454 | 45 | 135.0 | 9.6% | | | | | Not enough samples |
| 3 | 1497 | 43 | 129.0 | 8.9% | | | | | Not enough samples |
| 4 | 1562 | 65 | 195.0 | 13.0% | | | | | Not enough samples |
| 5 | 1643 | 81 | 243.0 | 15.6% | | | | | Not enough samples |
| ... | ... | ... | ... | ... | | | | | ... |
| 24 | 1883 | 7 | 21.0 | 1.1% | | | | | Not enough samples |
| 25 | 1898 | 15 | 45.0 | 2.4% | 61.1 | 122.0 | −183.0 | 305.2 | Normal |
| 26 | 1895 | −3 | −9.0 | −0.5% | 58.3 | 120.3 | −182.3 | 298.9 | Less than 1%: OK |
| 27 | 1932 | 37 | 111.0 | 5.9% | 60.3 | 118.3 | −176.3 | 297.0 | Normal |
| 28 | 1959 | 27 | 81.0 | 4.2% | 61.1 | 116.1 | −171.1 | 293.3 | Normal |

TABLE 1-continued

Example of determination of normal storage container behavior

| Time | Volume Size (KB) | Change (KB) | Rate of Change per Day (KB) | Change (%) | Mean Change (KB) | Std. Dev. (KB) | Range of Normal Change Low | High | Action |
|---|---|---|---|---|---|---|---|---|---|
| 29 | 1925 | −34 | −102.0 | −5.2% | 55.3 | 118.0 | −180.8 | 291.3 | Normal |
| 30 | 2305 | 380 | 1140.0 | 59.2% | 92.7 | 232.4 | −372.1 | 557.5 | Not normal |
| 31 | 2419 | 114 | 342.0 | 14.8% | 101.0 | 232.8 | −364.7 | 566.7 | Normal |

What is claimed is:

1. A method for monitoring a usage change rate of a storage container connected to a storage server, comprising the steps of:

obtaining, by the storage server, a current space usage value for the storage container;

calculating, by the storage server, the usage change rate of the storage container, wherein the usage change rate is determined based on a difference between the current space usage value and a prior space usage value;

determining, by the storage server, whether the usage change rate of the storage container is within a predetermined range, the predetermined range being based on a representative sample of prior space usage values and a difference from the representative sample, wherein the representative sample is a mean of a predetermined number of prior space usage values, wherein the difference from the representative sample is a standard deviation of the predetermined number of prior space usage values, and wherein the predetermined range is further based on a usage change rate sensitivity value;

generating, by the storage server, a current status indicator based on the usage change rate, wherein the current status indicator is an in-range status indicator if the usage change rate is within the predetermined range, and wherein the current status indicator is an out-of-range status indicator if the usage change rate is outside of the predetermined range;

comparing, by the storage server, the current status indicator with a previous status indicator;

generating, by the storage server, an alert if the current status indicator is different from the previous status indicator.

2. The method according to claim 1, wherein the obtaining step includes polling the storage container for the current space usage value.

3. The method according to claim 2, wherein the polling step is performed on a periodic basis.

4. The method according to claim 1, wherein the calculating step calculates the usage change rate based on the equation:

change rate=abs($d2-d1$)/[$t2-t1$], where d1 is the prior space usage value of the storage container, t1 is a timestamp at which d1 is collected, d2 is the current space usage value of the storage container, and t2 is a timestamp at which d2 is collected.

5. The method according to claim 1, wherein the predetermined range is based on the equation:

[M−(x*SD)] to [M+(x*SD)], where M is the mean of the predetermined number of prior space usage values, SD is the standard deviation of the predetermined number of prior space usage values, and x is the usage change rate sensitivity value of the storage container.

6. The method according to claim 1, wherein the generating step includes generating an event if the usage change rate of the storage container is within the predetermined range.

7. The method according to claim 1, further comprising the step of:

saving the current space usage value in a database.

8. The method according to claim 1, further comprising the steps of:

determining if a predetermined number of space usage values have been obtained for the storage container; and repeating the obtaining step and the calculating step until the predetermined number of space usage values have been obtained.

9. The method according to claim 1, further comprising the steps of:

evaluating if the usage change rate is greater than a noise threshold; and performing the determining step and the generating step only if the usage change rate is greater than the noise threshold.

10. A system for monitoring a usage change rate of a storage container, the system comprising:

a processor to execute a set of instructions, wherein the set of instructions include:

a monitoring code segment for monitoring the usage change rate for the storage container, wherein the usage change rate is a difference between a current space usage value and a prior space usage value;

a determining code segment for determining whether the usage change rate is within a normal operating range based on a mean and a standard deviation of historical usage data for the storage container;

a first generating code segment for generating a current status indicator based on the determining result, wherein the current status indicator is an in-range status indicator if the usage change rate is within the normal operating range, and wherein the current status indicator is an out-of-range status indicator if the usage change rate is outside of the normal operating range;

a comparing code segment for comparing the current status indicator with a previous status indicator of the storage container;

a second generating code segment for generating an alert if the current status indicator and the previous status indicator are different;

a calculating code segment for calculating the usage change rate of the storage container based on the current space usage value and a prior space usage value; and a second determining code segment for determining whether the usage change rate of the storage container is within a predetermined range, wherein the predetermined range is based on a representative sample of prior space usage values, a difference from the representative sample, and a usage change rate sensitivity value; and a storage device to store the set of instructions for execution by the processor.

11. The storage medium according to claim 10, wherein the monitoring code segment includes an obtaining code segment for obtaining a current space usage value for the storage container.

12. The storage medium according to claim 11, wherein the obtaining code segment includes a polling code segment for polling the storage container for the current space usage value.

13. The storage medium according to claim 10, wherein the calculating code segment calculates the usage change rate based on the equation:

change rate=abs($d2-d1$)/[$t2-t1$], where d1 is the prior space usage value of the storage container, t1 is a timestamp at which d1 is collected, d2 is the current space usage value of the storage container, and t2 is a timestamp at which d2 is collected.

14. The storage medium according to claim 10, wherein
   the representative sample is a mean of a predetermined number of prior space usage values; and
   the difference from the representative sample is a standard deviation of the predetermined number of prior space usage values.

15. The storage medium according to claim 14, wherein the predetermined range is based on the equation:

[M−(x*SD)] to [M+(X*SD)], where M is the mean of the predetermined number of prior space usage values, SD is the standard deviation of the predetermined number of prior space usage values, and x is the usage change rate sensitivity value of the storage container.

16. The storage medium according to claim 10, further comprising:
   a sending code segment for sending the alert to a user device.

17. A method implemented using a storage server for monitoring a usage change rate of a storage container, the method comprising:
   collecting, by the storage server, a plurality of space usage samples for the storage container;
   determining, by the storage server, whether a specific number of space usage samples have been collected, wherein the specific number of space usage samples is determined based on a predetermined set of sampling factors;
   calculating, by the storage server, the usage change rate of the storage container subsequent to determining that a specific number of space usage samples have been collected, wherein the usage change rate at a given moment is computed based on a current space usage value at the given moment and a prior space usage value from the plurality of space usage samples;
   determining, by the storage server, whether the usage change rate of the storage container is within a predetermined range, wherein the predetermined range is based on a representative sample of the plurality of space usage samples and a difference from the representative sample, wherein the representative sample is a mean of a predetermined number of prior space usage values, wherein the difference from the representative sample is a standard deviation of the predetermined number of prior space usage values, and wherein the predetermined range is further based on a usage change rate sensitivity value;
   generating, by the storage server, a current status indicator based on the usage change rate, wherein the current status indicator is an in-range status indicator if the usage change rate is within the predetermined range, and the current status indicator is an out-of-range status indicator if the usage change rate is outside of the predetermined range;
   comparing, by the storage server, the current status indicator with a previous status indicator;
   generating an alert if the current status indicator is different from the previous status indicator.

18. The method according to claim 17, wherein the predetermined set of sampling factors include at least one of: a field of use of the storage container, a type of the storage container, a workload requirement of the storage container, or a user preference.

* * * * *